United States Patent
Blondeau

[19]

[11] Patent Number: 6,053,551
[45] Date of Patent: Apr. 25, 2000

[54] EXTENSION PIVOT "SWING PORCH"

[76] Inventor: Richard Blondeau, 5185 Route Domaine du Lac, St-Ferdinand, Que., Canada, G0N 1N0

[21] Appl. No.: 09/139,867

[22] Filed: Aug. 25, 1998

[51] Int. Cl.[7] .................................................. B62D 33/08
[52] U.S. Cl. .................................... 296/26.15; 296/26.01; 296/172; 296/176
[58] Field of Search ............................. 296/26.15, 26.14, 296/26.12, 26.11, 26.01, 165, 171, 172, 176

[56] References Cited

U.S. PATENT DOCUMENTS

| | | | |
|---|---|---|---|
| 1,614,598 | 1/1927 | Brainard | 296/26.15 |
| 1,965,451 | 7/1934 | Brown | 296/26.15 |
| 2,154,810 | 8/1939 | Goeddertz | 296/26.15 X |
| 2,384,659 | 9/1945 | Wait | 296/26.15 |
| 3,737,191 | 6/1973 | Fackre | 296/26.15 |
| 4,312,159 | 1/1982 | Paul | 296/26.15 X |
| 5,711,566 | 1/1998 | Lesmeister et al. | 296/26.15 |
| 5,934,728 | 8/1999 | Nishi et al. | 296/26.15 |

*Primary Examiner*—Joseph D. Pape
*Attorney, Agent, or Firm*—Eric Fincham

[57] ABSTRACT

A swing-out section for a recreational vehicle such as a mobile home which has an exterior wall, a roof, and a floor, the swing-out section being moveable between open and closed positions with a first end of a wall section defining the swing-out section being pivotably connected to an adjacent portion of the exterior wall of the recreational vehicle, the swing-out section also having a roof section and a floor section, the arrangement being such that the swing-out section can be moved into and out of position by hand.

7 Claims, 2 Drawing Sheets

EXTENSION PIVOT "SWING PORCH"

BACKGROUND OF THE INVENTION

The present invention relates to recreational vehicles and more particularly, relates to a swing-out section for recreational vehicles to increase the space therein.

The use of recreational vehicles encompasses many different types of such vehicles, whether used for recreation or otherwise. Thus, known in the art are self-contained and self-propelled vehicles which range from converted buses to motorhomes. There are also many types of vehicles designed to be towed behind a motorized vehicle, some of these being popularly known as campers, trailers, etc.

The recreational vehicles are popular as they provide a means of travel while at the same time providing a shelter. Typically, the recreational vehicles are similar to a small home on wheels and they are capable of providing shelter for between four to eight people. Such vehicles have become very popular since they provide the opportunity for a family to enjoy the comforts of home while travelling and without worrying about reserving shelter each evening.

One of the drawbacks to designing floor plans is the size of the recreational vehicle. While the vehicles can have a substantial length, the width is inherently limited to that permitted on the roads. The limited width does not always provide for the most desirable floor layout in the recreational vehicle.

In order to overcome the above, there have been many proposals in the art for various ways to expand the space or add room to a recreational vehicle. One such proposal has been to expand vertically with pop-up tops or the like. It has also been proposed in the art to have various slide-out compartments to provide extra space within the vehicle. These compartments have typically been of a rectangular configuration such as shown in U.S. Pat. No. 5,570,924 to Few et al. In this patent, there is disclosed a powered scissors drive mechanism which with a drive screw provides for the expandable compartment.

Typically, such arrangements have used collapsible side walls such that the compartment is expanded in an accordion like fashion. Frame members must be supplied for the expandable compartment.

Generally, such slide-out compartments have incorporated the slide-out assembly within the recreational vehicle main frame. As such assemblies have a substantial weight, drive mechanisms are required and have ranged from gear drive assemblies, threaded drive screws, scissors, etc.

One common feature of the above arrangements is the relative complexity and expense of such arrangements. While additional space is provided, it comes at a cost of weight increases, substantial costs, and possible repair problems.

SUMMARY OF THE INVENTION

It is an object of the present invention to provide swing-out means for expanding the interior space of a recreational vehicle.

It is a further object of the present invention to provide a recreational vehicle having an expandable section, which expandable section is easy to use and does not require drive means for moving the expandable compartment into and out of an expanded condition.

According to one aspect of the present invention, there is provided an improvement in a recreational vehicle having an exterior wall, a roof and a floor, the improvement comprising a swing-out section moveable between open and closed positions, the swing-out section comprising a first wall section forming a portion of the exterior wall when said swing-out section is in the closed position, a first end of the first wall section being pivotably mounted with respect to an adjacent portion of the exterior wall, a second wall section connected to a second end of the first wall section, the second wall section extending inwardly of the recreational vehicle when the swing-out section is in a closed position, a floor section extending between the first wall section and the second wall section, and a roof section extending between the front wall section and the second wall section, the arrangement being such that when the swing-out section is in an open position, a second end of the second wall section is in an abutting relationship with the exterior wall.

In greater detail, the improvement of the present invention may be utilized in conjunction with any type of recreational vehicle. The term recreational vehicle includes any vehicle whether motorized or not. Exemplary of such vehicles are campers, trailers, motorhomes, etc.

The recreational vehicle may employ a single swing-out section or preferably, there are provided a plurality of such swing-out sections to provide for maximum interior space. The swing-out section may be oriented such that the second wall section which, in a closed position, faces interiorly of the recreational vehicle, will face either forwardly or rearwardly of the vehicle. In many instances, combinations of both forwardly and rearwardly facing swing-out sections may be employed.

Various different design possibilities are afforded by the use of the swing-out section of the present invention. Thus, the swing-out section could be employed in conjunction with an eating area wherein a table and/or seating means are incorporated therein. Similarly, the swing-out area may include seating means such as a sofa or the like in conjunction with a living room or salon portion of the vehicle.

The size of the swing-out area may be varied although preferably, it is such that it remains useable when in either the open or closed positions.

The swing-out section may include a window area, the window area either being in the first wall section which forms a portion of the exterior wall or in the second wall section which normally extends inwardly of the recreational vehicle.

A feature of the present invention is that no power driven mechanism is required to open and close the swing-out section. Rather, when in a closed position, it may be opened by hand due to its relative light weight and swinging motion. Similarly, it can be pushed or pulled to a closed position by a single individual.

In order to accomplish the above, there may be provided a glide member on the bottom of the swing-out section, the glide member being of a low friction material such as PTFE or the like. A similar glide member may be mounted on the floor structure to assist in the reduction of friction between the floor of the swing-out section and the floor of the recreational vehicle.

The pivoting motion of the swing-out section may conveniently be accomplished by use of a continuous vertical hinge between the first wall section and an adjacent portion of the exterior wall. Such an arrangement provides for the mechanical connection between the two portions. It will, of course, be understood that pivot pins or the like may be utilized.

The structure of the exterior wall may be any suitable including the use of metallic members, wood members, and the like.

Naturally, there is provided an arrangement wherein sealing between adjacent edges is accomplished when the swing-out section is in both its open and closed positions. Thus, one may use flanges and suitable weather stripping to accomplish the same.

The arrangement is such that the swing-out section, including a floor section and roof section, swing interiorly of the vehicle. When in an extended position, the floor of the swing-out section will naturally be slightly higher than the floor of the recreational vehicle. Preferably, the roof is slightly sloped to provide drainage during inclement weather.

BRIEF DESCRIPTION OF THE DRAWINGS

Having thus generally described the invention, reference will be made to the accompanying drawings illustrating an embodiment thereof, in which.

DESCRIPTION OF THE PREFERRED EMBODIMENTS

Figure 1:
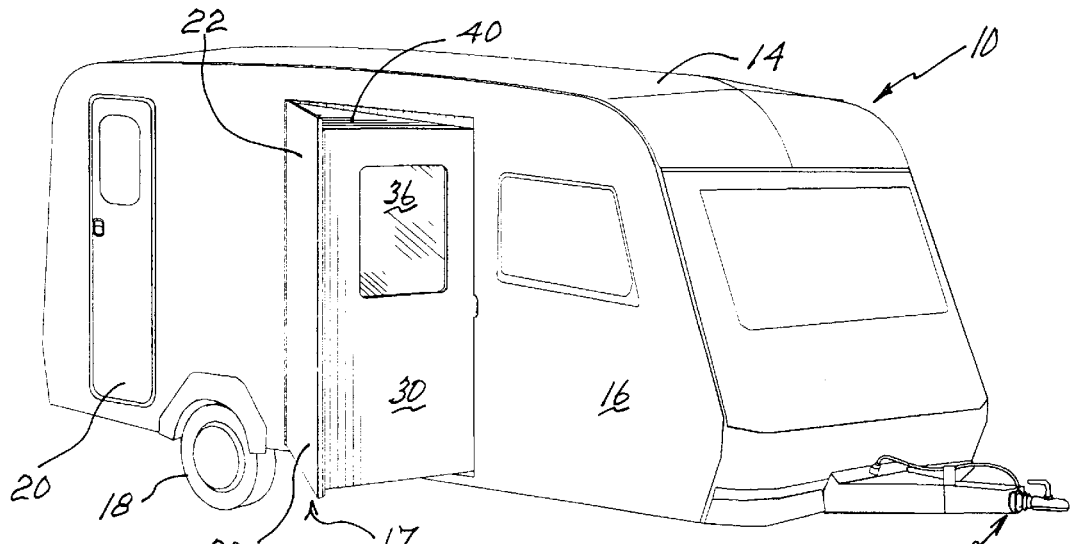
FIG. 1 is a perspective view of a recreational vehicle employing the improvement of the present invention.

Referring to the drawings in greater detail and by reference characters thereto, there is illustrated in FIG. 1 a trailer form of a recreational vehicle 10. Recreational vehicle 10 is designed to be towed, it has a hitch mechanism generally designated by reference numeral 12.

Recreational vehicle 10 has a roof which is designated by reference numeral 14 and a floor 15. There is provided an exterior wall 16 extending between and joining the exterior end walls which incorporates a swing-out section generally designated by reference numeral 17. Recreational vehicle 10 may also conveniently include a rear door 20.

Figure 2:
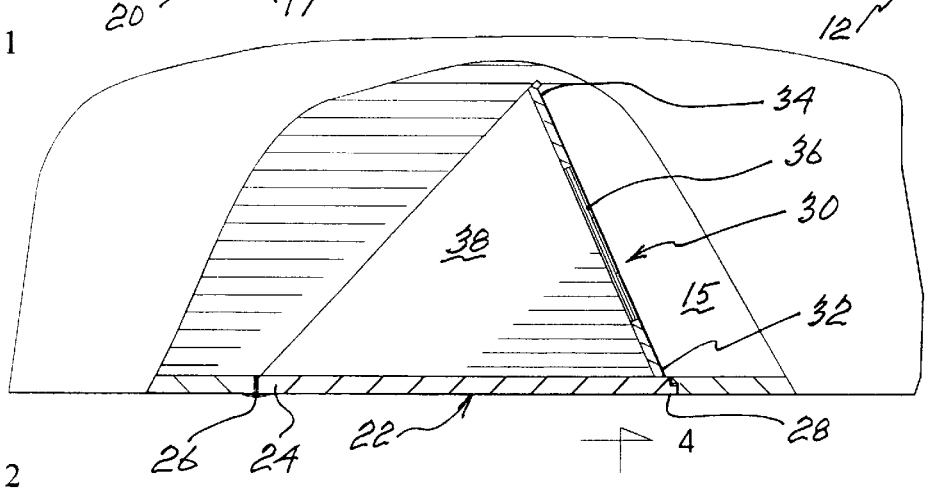
FIG. 2 is a top view, partially in cutaway, of a swing-out section when in a retracted position.
Figure 3:
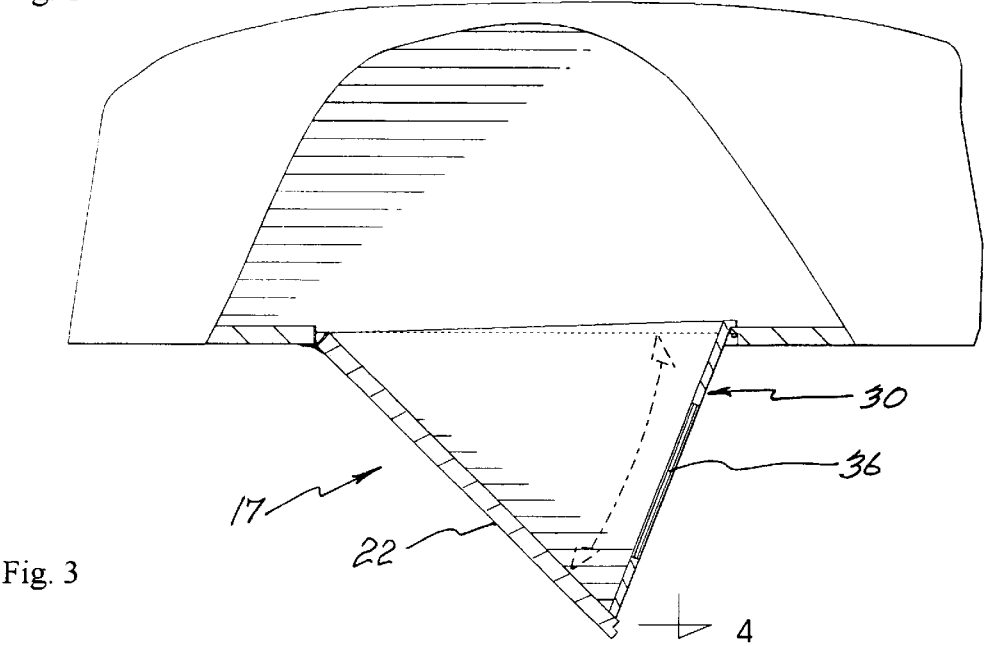
FIG. 3 is a view similar to FIG. 2 illustrating the swing-out in an extended or open position.

Swing-out section 17, as shown in FIGS. 2 and 3, is comprised of a first wall section 22 having a first end 24 secured to exterior wall 16 by means of a hinge member 26.

A second end 28 of first wall section 22 is, as shown in FIG. 2, in an abutting relationship with an adjacent segment of exterior wall 16 when swing-out section 17 is in a closed position.

Extending inwardly from second end 28 of first wall section 22 is a second wall section 30 having a first end 32 thereof connected to second end 28 of first wall section 22.

When swing-out section 17 is moved to its extended position, second end 34 of second wall section 30 is in an abutting relationship with exterior wall 16.

In the illustrated embodiment, there may be provided a window 36 in second wall section 30. First wall section 22 may likewise include a window if so desired.

Extending between first wall section 22 and second wall section 30 is a floor 38 which is of a generally triangular configuration. Similarly, a roof section 40 extends between first wall section 22 and second wall section 30.

Figure 4:
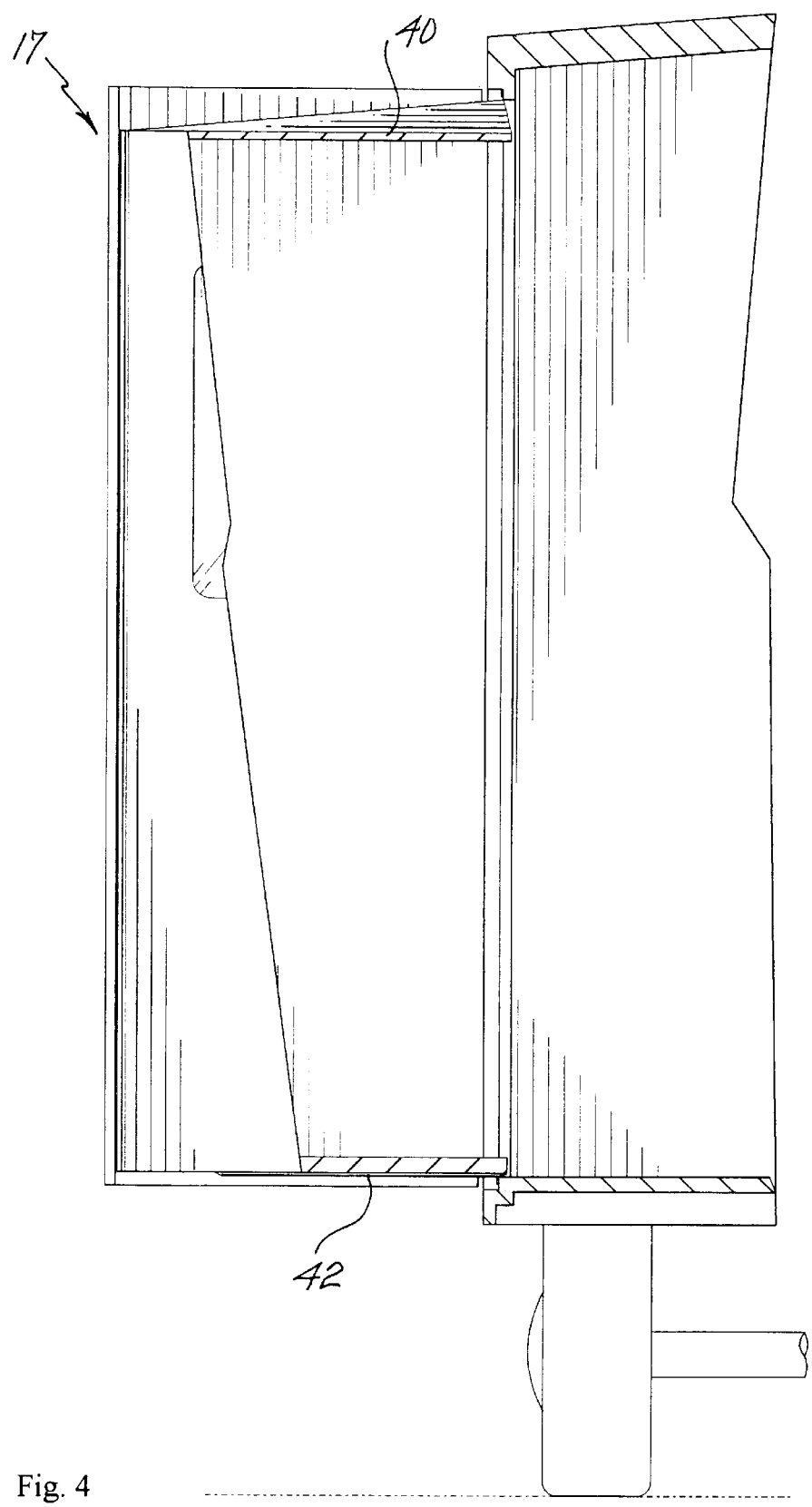
FIG. 4 is a sectional view taken along the line 4—4 of FIG. 3.

As may be seen in FIG. 4, a glide member 42 may be secured to the underside of floor 38.

For opening and closing swing-out section 17, there may be provided a handle with a suitable latch.

It will be understood that the above described embodiment is for purposes of illustration only and that changes and modifications may be made thereto without departing from the spirit and scope of the invention.

I claim:

1. In a recreational vehicle having a first exterior wall extending between and joining second and third exterior walls, a roof and a floor, the improvement comprising a swing-out section moveable between open and closed positions, said swing-out section comprising:

a first wall section forming a portion of said first exterior wall when said swing-out section is in said closed position, a first end of said first wall section being pivotably mounted with respect to an adjacent portion of said first exterior wall, said first wall section being located within said first exterior wall when said swing-out section is in said closed position such that said first wall section is spaced from said second and third exterior walls;

a second wall section connected to a second end of said first wall section, said second wall section extending inwardly of said recreational vehicle when said swing-out section is in a closed position;

a floor section extending between said first wall section and said second wall section; and a roof section extending between said first wall section and said second wall section;

the arrangement being such that when said swing-out section is in an open position, a second end wall of said second end wall section is in an abutting relationship with said exterior wall.

2. The recreational vehicle of claim 1 wherein said floor section includes a low friction glide member on an underside thereof to reduce friction when said swing-out section is moved between said open and closed positions.

3. The recreational vehicle of claim 1 further including a hinge member between said first end of said first wall section and said adjacent portion of said exterior wall.

4. The recreational vehicle of claim 1 further including a window in said second wall section.

5. The recreational vehicle of claim 4 wherein said second wall section is a substantially straight wall.

6. The recreational vehicle of claim 1 further including means for securing said swing-out section in said open and closed positions.

7. The recreational vehicle of claim 1 wherein said roof is sloped from the horizontal to provide drainage therefrom.

* * * * *